United States Patent
Kim et al.

(10) Patent No.: US 8,926,866 B2
(45) Date of Patent: Jan. 6, 2015

(54) HYDROGEN GENERATING APPARATUS USING STEAM REFORMING REACTION

(75) Inventors: Il Su Kim, Daejeon (KR); Young Dae Kim, Daejeon (KR); Myung Jun Kim, Daejeon (KR)

(73) Assignee: SK Innovation Co., Ltd., Seoul (KR)

(*) Notice: Subject to any disclaimer, the term of this patent is extended or adjusted under 35 U.S.C. 154(b) by 1284 days.

(21) Appl. No.: 12/734,447

(22) PCT Filed: Oct. 29, 2008

(86) PCT No.: PCT/KR2008/006373
§ 371 (c)(1),
(2), (4) Date: Apr. 30, 2010

(87) PCT Pub. No.: WO2009/057939
PCT Pub. Date: May 7, 2009

(65) Prior Publication Data
US 2010/0254893 A1    Oct. 7, 2010

(30) Foreign Application Priority Data
Nov. 1, 2007  (KR) .................. 10-2007-0111068

(51) Int. Cl.
*C01B 3/38* (2006.01)
*C10J 3/00* (2006.01)
*C01B 3/48* (2006.01)

(52) U.S. Cl.
CPC . *C01B 3/384* (2013.01); *C01B 3/48* (2013.01); *C01B 2203/0233* (2013.01); *C01B 2203/0283* (2013.01); *C01B 2203/043* (2013.01);*C01B 2203/0827* (2013.01); *C01B 2203/0883* (2013.01); *C01B 2203/0894* (2013.01);
(Continued)

(58) Field of Classification Search
USPC ................ 423/655; 48/76, 197 R; 252/373
See application file for complete search history.

(56) References Cited

U.S. PATENT DOCUMENTS 3,810,975 A * 5/1974 Brooke ..................... 423/652
2008/0219901 A1 9/2008 Yoon et al.

FOREIGN PATENT DOCUMENTS

| CN | 1186769 A | 7/1998 |
|---|---|---|
| JP | 10273301 | 10/1998 |

(Continued)

OTHER PUBLICATIONS

Second Action from the State Intellectual Property of P.R.C. For Application No. 200880114275.0 dated Oct. 24, 2012.
International Search Report for PCT/KR2008/006373 dated May 27, 2009.

*Primary Examiner* — Stanley Silverman
*Assistant Examiner* — Syed Iqbal
(74) *Attorney, Agent, or Firm* — Abelman, Frayne & Schwab

(57) ABSTRACT

The present invention provides a hydrogen generator for generating hydrogen through a steam-reforming process using hydrocarbons as a raw material and a method of operating the same, and, more particularly, provides a hydrogen generator for generating hydrogen through a steam reforming process, which can be stably operated because water is introduced into the hydrogen generator in the form of single phase vapor, and which can achieve high thermal efficiency using a proper heat exchanging method, and to a method of operating the same. According to the present invention, there is provided a heat exchanger network, in which heat necessary for a reforming reaction are obtained by the heat exchange of high-temperature exhaust gas or reformed gas, and in which, in a water gas converting reaction and a PSA reaction conducted at low temperatures compared to the reforming reaction, heat exchange is performed by low-temperature air or water, and the heat-exchanged air and the residual gas in the PSA reaction are used as a heat supply source for the reforming reactor together with fuel hydrocarbons, thereby minimizing the thermal loss of the hydrogen generator.

8 Claims, 1 Drawing Sheet

(52) U.S. Cl.
CP ... *C01B 2203/1041* (2013.01); *C01B 2203/1047* (2013.01); *C01B 2203/1058* (2013.01); *C01B 2203/1082* (2013.01); *C01B 2203/1235* (2013.01); *C01B 2203/1241* (2013.01); *C01B 2203/1247* (2013.01); *C01B 2203/127* (2013.01); *C01B 2203/1604* (2013.01); *C01B 2203/1614* (2013.01)

USPC .......................... 252/373; 48/197 R; 423/556

(56) References Cited

FOREIGN PATENT DOCUMENTS

| | | | |
|---|---|---|---|
| JP | 2005019245 | | 1/2005 |
| KR | 10-1999-0014655 A | * | 2/1999 |
| KR | 19990014655 | | 2/1999 |
| KR | 10-2006-0108039 A | * | 10/2006 |
| KR | 100674622 | | 1/2007 |

* cited by examiner

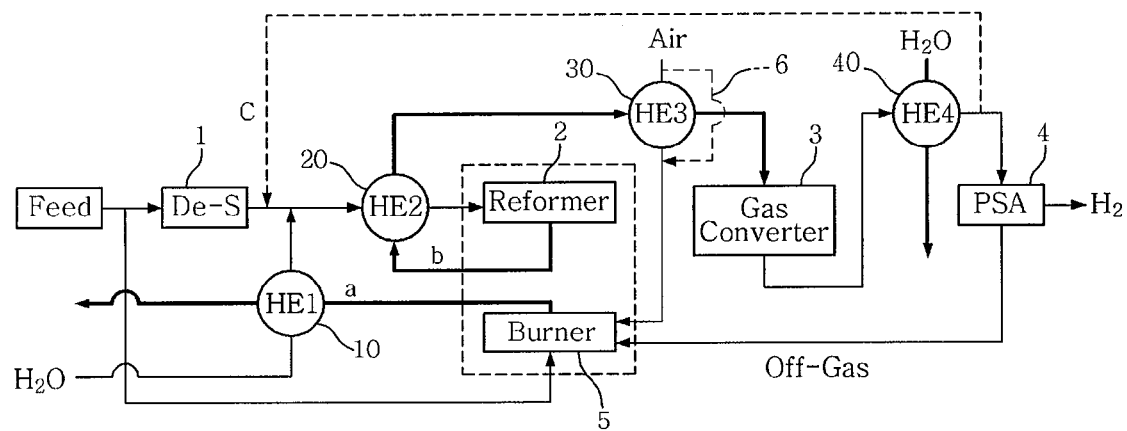

HYDROGEN GENERATING APPARATUS USING STEAM REFORMING REACTION

CROSS-REFERENCE TO RELATED APPLICATIONS

This application is a National Phase of PCT/KR2008/006373, filed Oct. 29, 2008, which claims priority from Korean Application No. 10-2007-0111068, filed Nov. 1, 2007, which are incorporated herein by reference.

TECHNICAL FIELD

The present invention relates to a hydrogen generator which easily starts up and stably operates and which has high thermal efficiency and a method of operating the same, and, more particularly, to a hydrogen generator using steam reforming, which can be stably operated because water is introduced into the hydrogen generator in the form of a single phase vapor, and which can achieve high thermal efficiency using a proper heat exchanging method, and to a method of operating the same.

BACKGROUND ART

In large sized hydrogen producing apparatuses for supplying hydrogen necessary for a refining process (a hydrodesulfurizing process, a heavy oil upgrading process or the like), a steam boiler has been additionally used in order to stably supply hydrogen. However, in a middle or small sized (1~1000 $Nm^3/h$) hydrogen producing apparatus such as a fuel cell system for an automobile, household, distributed electric generation or the like, in order to increase its thermal efficiency and decrease its size, it is required to supply steam through self-recovery of the heat of exhaust gas or reformed gas. In a steam reforming process, it is very important to maintain the ratio of steam to hydrocarbons constant, and when a two-phase stream occurs in a state in which water is not completely vaporized, the flow rate and composition of a product is changed by feed fluctuation, so that the operation of a system becomes entirely unstable, thereby causing the breakdown of measuring instruments. Further, when the ratio of steam to hydrocarbons (S/C) instantaneously changes, the activity of a catalyst is deteriorated by coking etc., thereby decreasing the durability of an apparatus. For this reason, a heat exchanger network or a heat exchanger which can stably supply steam through self-recovery of heat must be designed and operated.

Further, at the same time as attaining stable operation, it is required to attain high thermal efficiency without additional apparatuses or costs. In particular, in the case of a hydrogen generator for a fuel cell for electric generation, the thermal efficiency of the hydrogen generator can be increased by recovering excess heat using hot water and then converting the recovered heat into usable heat.

Furthermore, the hydrogen generator must be smoothly operated without additional problems (hydrogen-related safety verification, supply and demand of related apparatuses, power loss, etc.) occurring when main apparatuses are preheated by a commonly-used electric heater and problems with the approval or permission of a hydrogen generator by introducing nitrogen ($N_2$) into a feed supply line to preheat main apparatuses (a water gas converter for converting carbon monoxide (CO) in reformed gas into hydrogen ($H_2$) and carbon dioxide ($CO_2$), and, if necessary, a desulfurization reactor) to their reaction temperatures and by recycling the reacted gas at the rear end of the water gas converter.

DISCLOSURE

Technical Problem

Thus, in order to overcome the above problems, the present inventors have researched a heat exchanging method by which a heat exchanger can be stably operated through the stable supply of steam without the two phase stream of water and by which the thermal efficiency of the heat exchanger can be increased through additional heat exchange. As a result, they found that water supplied to a reforming apparatus is previously heat-exchanged by exhaust gas discharged from the reforming apparatus to overheat it, so that the water is converted into single-phase steam, thereby overcoming the fluctuation in feed supply stream, and that, when heat exchangers are installed using exothermic and endothermic characteristics of the respective steps of a hydrogen producing process, thermal efficiency can be remarkably improved. Based on these findings, the present invention was completed.

Accordingly, the present invention has been made keeping in mind the above problems occurring in the prior art, and an object of the present invention is to provide a hydrogen generator using steam reforming, provided with a heat exchanging system in which the phase separation of water does not occur and which has high thermal efficiency.

Another object of the present invention is to provide a method of operating the hydrogen generator.

Technical Solution

In order to accomplish the above objects, an aspect of the present invention provides a hydrogen generator using steam reforming, including: a desulfurizer for desulfurizing a hydrocarbon feed; a reformer for performing a steam-reforming reaction by mixing the desulfurized hydrocarbon feed with a water feed and then heating the mixture using a burner to form a reformed gas; a water gas converter for converting carbon monoxide (CO) in the reformed gas obtained from the reformer into a converted gas of hydrogen ($H_2$) and carbon dioxide ($CO_2$); a pressure swing absorption (PSA) unit for separating hydrogen ($H_2$) from the converted gas; a first heat exchanger for superheating the water feed to an evaporation temperature of water using the exhaust gas discharged from the burner before the water feed is mixed with the desulfurized hydrocarbons; a second heat exchanger for preheating the mixture of the desulfurized hydrocarbon feed and superheated water using the reformed gas discharged from the reformer; a third heat exchanger for decreasing a temperature of the reformed gas using external air before the reformed gas is introduced into the water gas converter; and a fourth heat exchanger for additionally decreasing a temperature of the gas discharged from the water gas converter using tap water before the converted gas is introduced into the PSA unit.

Another aspect of the present invention provides a method of operating the steam-reforming hydrogen generator of claim 1 or 2, including: (a) repeating a preheating process including the steps of filling the reformer with nitrogen gas such that an inner pressure of the reformer is 6~8 bars, heating the reformer to a temperature of 700~800° C. using the hydrocarbon feed and external air to discharge high-temperature nitrogen gas, sequentially passing the discharged high-temperature nitrogen gas through the second heat exchanger, third exchanger, water gas converter and fourth heat exchanger and recycling the nitrogen gas from a rear end of the fourth heat exchanger to a rear end of the desulfurizer until the feed water previously introduced into the first heat exchanger is formed into vapor; and (b) stopping supplying nitrogen gas to the reformer when vapor is formed by the first heat exchanger in the (a) and introducing the hydrocarbon feed into the reformer such that a ratio of steam to carbon (S/C ratio) is 2.5~3.5 based on the supply of pure water.

Advantageous Effects

The hydrogen generator using steam reforming according to the present invention is advantageous in that the hydrogen generator can be stably operated due to the removal of a two phase stream of water, and in that the resulting products heated by a steam-reforming reaction can be used to preheat the feed of a reforming reaction, and heat exchangers are additionally installed, and heat exchange media are reused, thus maximizing the thermal efficiency of the hydrogen generator.

DESCRIPTION OF DRAWINGS

FIG. 1 is a schematic block diagram showing a hydrogen generator using steam reforming according to the present invention.

DESCRIPTION OF THE ELEMENTS IN THE DRAWINGS

1: desulfurizer
2: reformer
3: water gas converter
4: PSA unit
5: burner
6: bypass line
10: first heat exchanger
20: second heat exchanger
30: third heat exchanger
40: fourth heat exchanger

BEST MODE

Hereinafter, preferred embodiments of the present invention will be described in detail with reference to the attached drawings.

As described above, the present invention provides a hydrogen generator using steam reforming, having a heat exchanger network, in which heat necessary for a reforming reaction are obtained by the heat exchange of high-temperature exhaust gas or reformed gas, and single phase water is introduced into a reforming reactor, and in which, in a water gas converting reaction and a PSA reaction conducted at low temperatures compared to the reforming reaction, heat exchange is performed by low-temperature air or water, and the heat-exchanged air and the residual gas in the PSA reaction are used as a heat supply source for the reforming reactor together with fuel hydrocarbons, thereby minimizing the thermal loss of the hydrogen generator.

FIG. 1 is a schematic block diagram showing a hydrogen generator using steam reforming according to the present invention. The hydrogen generator includes a desulfurizer 1 for desulfurizing a hydrocarbon feed; a reformer 2 for performing a steam-reforming reaction by mixing the desulfurized hydrocarbon feed with superheated water and then heating the mixture using a burner 5 to form a reformed gas; a water gas converter 3 for converting carbon monoxide (CO) in the reformed gas obtained from the reformer 2 into a converted gas of hydrogen ($H_2$) and carbon dioxide ($CO_2$); a pressure swing absorption (PSA) unit 4 for separating hydrogen ($H_2$); a first heat exchanger 10 for superheating a water feed using the exhaust gas discharged from the burner 5 before the water feed is mixed with the desulfurized hydrocarbons; a second heat exchanger 20 for preheating the mixture of the desulfurized hydrocarbons and superheated water using the reformed gas discharged from the reformer 2; a third heat exchanger 30 for decreasing the temperature of the reformed gas using external air before the reformed gas is introduced into the water gas converter 3; and a fourth heat exchanger 40 for additionally decreasing the temperature of the gas discharged from the water gas converter 3 using tap water before the converted gas is introduced into the PSA unit 4.

Specifically, a part of the hydrocarbons is introduced into the desulfurizer 1, and the other part of the hydrocarbons, air heated by the heat exchange between the reformed gas and the air in the third heat exchanger and the residual gas having passed the PSA unit 4 may be used as fuel of the burner 5.

More specifically, for example, LNG (liquefied natural gas) is used as a feed for supplying hydrocarbons. In addition, gaseous or liquid hydrocarbons including LNG, LPG (liquefied petroleum gas), naphtha, gasoline, kerosene and the like may be used as the feed. The LNG is divided into feed and fuel, and the feed is introduced into the desulfurizer 1 and the fuel is introduced into the burner 5.

In the present invention, a method of hydrodesulfurizing sulfur compounds or a method of directly adsorbing sulfur compounds on a catalyst may be used as a method of desulfurizing hydrocarbons. In this case, metals such as cobalt (Co), zinc (Zn), copper (Cu) and the like, and oxides or sulfides thereof, zeolite, active carbon, and the like may be used as the catalyst. The sulfur compounds can be removed from the hydrocarbons by adsorbing the sulfur compounds using zeolite or active carbon at room temperature or by hydrodesulfurizing the hydrocarbons at a temperature of 300~400° C. depending on the condition of feed.

The desulfurized hydrocarbons (feed) and water are mixed and then introduced into the reformer 2. In this case, the water mixed with the desulfurized hydrocarbons is primarily superheated to a temperature of 180~220° C. by the first heat exchanger 10 through which exhaust gas (a) passes, and is then mixed with the desulfurized hydrocarbons to form a mixture. Subsequently, the mixture of the desulfurized hydrocarbons and the superheated water is preheated to a temperature of 450~500° C. by the second heat exchanger 20 through which high-temperature reformed gas (b) discharged from the reformer 2 passes, and is then introduced into the reformer 2. As described above, the water included in the feed is introduced into the reformer not in a state in which it is separated into two phases of a liquid phase and a gas phase but in a state in which it is sufficiently vaporized and thus maintained in a single vapor phase, because the temperature of the water is increased by heat exchange. This formation and maintenance of the single vapor phase of the water can be realized by suitably designing the heat exchangers in consideration of a pressure of the water introduced into the first heat exchanger and an evaporation temperature of the water at this pressure. That is, when heat exchangers, by which heat necessary for increasing the temperature of the water higher than the evaporation point thereof at the pressure applied to the water can be transferred from exhaust gas to the water, are provided, and when a suitable amount of exhaust gas is supplied, the single vapor phase can be continuously maintained.

According to an embodiment of the present invention, while exhaust gas is cooled from 660° C. or more to 60° C. or less by the first heat exchanger 10, the heat of the exhaust gas is applied to the distilled water pressurized to 8 atms or more and then supplied by a feed pump (not shown), and thus steam having a temperature of 180° C. or more and a pressure of 8.5 atms. In this case, since the condensation temperature of steam at a pressure of 8.5 atms is 175° C., single phase steam can be stably supplied.

Meanwhile, it is preferred that the hydrocarbon feed introduced into the reformer be mixed with steam such that the ratio of steam to carbon (S/C ratio) is 2.5~3.5. Here, when the S/C ratio is less than 2.5, there is a problem that the performance of the reformer is deteriorated because a reforming catalyst is poisoned by carbon due to the insufficiency of steam, and when the S/C ratio is more than 3.5, there is a problem that the thermal efficiency of the reformer is deteriorated due to the introduction of excess steam.

Meanwhile, the heat exchanger used in the present invention may include, but may not be limited to, a finned tube type heat exchanger and a shell and tube type heat exchanger. Preferably, the heat exchanger used in the present invention may include a finned tube type heat exchanger provided with a true countercurrent heat exchanger and a multitube hairpin type heat exchanger provided with a twisted tape vortex generator.

The reformer 2 serves to bring the mixture into contact with a reforming catalyst and steam-reform the mixture to prepare highly-concentrated hydrogen-containing gas. The reformer 2 is provided thereunder with the burner for heating the reformer 2. As the reforming catalyst, a catalyst in which a carrier such as alumina, silica or the like is supported with ruthenium, nickel or the like may be used. In the reformer 2, the steam-reforming of the desulfurized hydrocarbons are conducted by the following reaction processes:

$$C_mH_n + mH_2O \rightarrow mCO + (m+n/2)H_2$$

$$CO + 3H_2 \leftrightarrow CH_4 + H_2O$$

$$CO + H_2O \leftrightarrow CO_2 + H_2$$

The reformer 2 is heated by the burner 5, and the operation temperature thereof is maintained at 500~800° C. in order to supply reaction heat accompanying a catalytic reaction and increase the formation rate of hydrogen. The exhaust gas of 650~700° C. having heated the reformer 2 is introduced into the first heat exchanger 10, and the reformed gas (CO, $CO_2$, $CH_4$, $H_2$) of 550~600° C. formed by the steam-reforming reaction is introduced into the second heat exchanger 20.

The reformed gas is introduced into the second heat exchanger 10, and is then cooled by transferring heat to the desulfurized hydrocarbons and superheated steam flowing into the reformer 2. In order to further decrease the temperature of the reformed gas cooled by the second heat exchanger 10 before it is introduced into the water gas converter 3, external air is introduced into the third heat exchanger 30 using an air blower (not shown), so that the external air is heat-exchanged with the reformed gas, thereby cooling the reformed gas to a temperature of about 180~200° C. before it reaches the inlet of the water gas converter 3.

The temperature of the reformed gas introduced into the water gas converter 3 can be precisely controlled by an air bypass line 6. When the temperature of the reformed gas is lower than 180° C., the external air introduced into the third heat exchanger 30 is bypassed through the air bypass line 6, so that the amount of the external air heat-exchanged with the reformed gas is decreased, thereby increasing the temperature of the reformed gas introduced into the water gas converter 3. In contrast, when the temperature of the reformed gas is higher than 200° C., the temperature of the reformed gas introduced into the water gas converter 3 can be decreased by increasing the amount of the external air introduced into the third heat exchanger 30.

The water gas converter 3 and the water gas conversion reaction therein are well known to those skilled in the art, and the water gas converter 3 is filled with a water gas conversion catalyst for converting carbon monoxide (CO) in the reformed gas into carbon dioxide ($CO_2$) and hydrogen ($H_2$). As the water gas conversion catalyst, an iron-chromium based catalyst (for example, $Fe_2O_3$—$Cr_2O_3$ catalyst) or a copper based catalyst, which is an oxide of copper-zinc, may be used. In the case of the $Fe_2O_3$—$Cr_2O_3$ catalyst, it is preferred that the water gas conversion reaction be conducted at a temperature of 300~450° C., and in the case of the copper based catalyst, it is preferred that the water gas conversion reaction be conducted at a temperature of 200~250° C. In this case, the water gas conversion reaction is represented by the following Formula: $CO + H_2O \leftrightarrow CO_2 + H_2$.

The gas discharged from the water gas converter 3 is cooled to a temperature of 30~40° C., that is, the temperature of the inlet of the PSA unit 4 by the fourth heat exchanger 40 in which the gas is heat-exchanged with tap water, and is then introduced into the PSA unit 4. In this case, the tap water used to cool the gas discharged from the water gas converter 3 is recovered as hot water of about 60° C. or more, and can thus be used as hot water for bathing or hot water for heating floors in an electric generating system of individual houses, apartments or collective residential facilities.

PSA (Pressure Swing Absorption) is generally employed by those skilled in the art in order to separate hydrogen, and is a method of producing high-purity hydrogen by adsorbing and removing impurities from highly-concentrated hydrogen-containing gas.

The high-purity hydrogen obtained from the PSA unit 4 is properly used at need, and the residual gas (off-gas) obtained therefrom is recovered and then used as the fuel of the burner 5 for heating the reformer 2.

Hydrocarbon fuel such as LNG, air preheated by the third heat exchanger and residual gas (off-gas) discharged from the PSA unit are used as the fuel of the burner for heating the reformer. The exhaust gas providing combustion heat to an endothermic reaction necessary for the steam reforming reaction is introduced into the first heat exchanger 10, and is thus used to superheat water.

Mode for Invention

Hereinafter, a method of operating the hydrogen generator provided with the heat exchanger network at the time of its start-up will be described in detail.

A predetermined amount of nitrogen ($N_2$) is introduced into the reformer through a feed supply line to transfer heat to the water gas converter from the reformer and thus preheat the water gas converter, and then the nitrogen is recycled at the rear end of the water gas converter, thereby enabling the hydrogen generator to easily start up without the additional consumption of nitrogen.

Specifically, hydrocarbon fuel and air are introduced into the burner to operate the burner, and nitrogen ($N_2$) is introduced into the reformer to increase the inner pressure of the reformer to 6~8 bars and then heated to a temperature of 700~800° C., and then the heated nitrogen passes through the second and third heat exchangers and water gas converter to preheat them, and thus the water gas conversion reaction is conducted in the water gas converter immediately after the introduction of the hydrocarbon fuel and air.

The temperature of nitrogen gradually decreases while nitrogen passes through the second and third heat exchangers and water gas converter, and further decreases at the rear end of the fourth heat exchanger while passing through the fourth heat exchanger. Then, the nitrogen, the temperature of which has decreased, is recycled to the rear end of the desulfurizing unit through a [C] line, but the temperature of the recycled nitrogen gradually increases according to the increase in the temperature of the reformer due to the heating of the reformer by the burner.

The process of preheating nitrogen is continuously conducted until water ($H_2O$) is formed into vapor by introducing the water corresponding to about 25~35% of that at the time of normal operation and then heat-exchanging the water with high-temperature exhaust gas in the first heat exchanger. When it is confirmed that vapor was formed, the recycling of nitrogen is stopped, and hydrocarbon feed is introduced in accordance with the water content, thus naturally purifying the nitrogen present in the reactor. Thereafter, the water content is gradually increased to 100%, and then pure hydrogen having a purity of 99.99% or more is produced through the PSA unit, and residual gas (off-gas) is transferred to the burner for heating the reformer and then recovered and used as fuel.

In the hydrogen generator provided with a heat exchanger network according to the present invention, several heat exchangers are organically combined with each other, and residual gas (off-gas) discharged from the PSA unit is reused as feed, thereby accomplishing thermal efficiency more than 70% that of a conventional hydrogen generator using steam reforming.

The invention claimed is:

1. A hydrogen generator using steam reforming, having a reforming reaction of a mixture of a desulfurized hydrocarbon feed and a water feed by heating the mixture using a burner to form a reformed gas; a water gas converter for converting carbon monoxide (CO) in the reformed gas obtained from the reformer into a converted gas of hydrogen ($H_2$) and carbon dioxide ($CO_2$); and a pressure swing absorption (PSA) unit for separating hydrogen ($H_2$) from the converted gas; characterized in that the hydrogen generator comprises:
   a first heat exchanger for superheating the water feed to higher than an evaporation temperature of water through heat exchange with the exhaust gas discharged from the burner to convert the water feed into single-phase vapor before the water feed is mixed with the desulfurized hydrocarbons, thereby forming a mixture of the desulfurized hydrocarbon feed and the superheated water;
   a second heat exchanger for preheating the mixture of the desulfurized hydrocarbon feed and the superheated water through heat exchange with the reformed gas discharged from the reformer, whereby the superheated water is introduced into the reformer in such a state that a single vapor phase is maintained without phase separation of water;
   a third heat exchanger for decreasing a temperature of the reformed gas through heat exchange with external air before the reformed gas is introduced into the water gas converter; and
   a fourth heat exchanger for additionally decreasing a temperature of the gas discharged from the water gas converter through heat exchange with tap water before the converted gas is introduced into the PSA unit,
   wherein a bypass line for controlling an amount of air introduced into the third heat exchanger is further included to control a temperature of the reformed gas at an inlet of the water gas converter.

2. The hydrogen generator according to claim 1, wherein the hydrocarbon feed, the air heated by the heat exchange between the reformed gas and the air in the third heat exchanger, and the residual gas having passed the PSA unit 4 are used as fuel of the burner.

3. The hydrogen generator according to claim 1, wherein each of the first, second, third and fourth heat exchangers is a finned tube type heat exchanger or a shell and tube type heat exchanger.

4. The hydrogen generator according to claim 1, wherein the temperature of the reformed gas at an inlet of the water gas converter is set to 180~200° C.

5. The hydrogen generator according to claim 1, wherein the hydrocarbon feed includes gaseous or liquid hydrocarbons including LNG, LPG, naphtha, gasoline, kerosene, and the like.

6. The hydrogen generator according to claim 2, further comprising:
   a bypass line for controlling an amount of air introduced into the third heat exchanger to set a temperature of the reformed gas at an inlet of the water gas converter to 180~200° C.

7. The hydrogen generator according to claim 2, wherein the hydrocarbon feed includes gaseous or liquid hydrocarbons including LNG, LPG, naphtha, gasoline, kerosene, and the like.

8. A method of operating the steam-reforming hydrogen generator of claim 1, comprising:
   (a) repeating a preheating process including the steps of filling the reformer with nitrogen gas such that an inner pressure of the reformer is 6~8 bars, heating the reformer to a temperature of 700° C. 800° C. using the hydrocarbon feed and external air to discharge high-temperature nitrogen gas, sequentially passing the discharged high-temperature nitrogen gas through the second heat exchanger, third exchanger, water gas converter and fourth heat exchanger and recycling the nitrogen gas from a rear end of the fourth heat exchanger to a rear end of the desulfurizer until the feed water previously introduced into the first heat exchanger is formed into vapor; and
   (b) stopping supplying nitrogen gas to the reformer when vapor is formed by the first heat exchanger in the step (a) and introducing the hydrocarbon feed into the reformer such that a ratio of steam to carbon (S/C ratio) is 2.5~3.5 based on the supply of pure water,
   wherein the feed water introduced in the step (a) corresponds to 25-35% of that at the time of normal operation.

* * * * *